(12) United States Patent
Beausoleil et al.

(10) Patent No.: US 7,929,865 B2
(45) Date of Patent: Apr. 19, 2011

(54) FREE SPACE WDM SIGNAL DETECTOR

(75) Inventors: Raymond G. Beausoleil, Redmond, WA (US); Wei Wu, Mountain View, CA (US); David A. Fattal, Mountain View, CA (US); Marco Fiorentino, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 11/881,557

(22) Filed: Jul. 27, 2007

(65) Prior Publication Data

US 2009/0027658 A1 Jan. 29, 2009

(51) Int. Cl.
*H04B 10/00* (2006.01)
(52) U.S. Cl. ....................................................... 398/118
(58) Field of Classification Search .................... 398/118
See application file for complete search history.

(56) References Cited

U.S. PATENT DOCUMENTS

| | | | |
|---|---|---|---|
| 3,971,065 A | 7/1976 | Bayer | |
| 5,965,875 A | 10/1999 | Merrill | |
| 6,519,383 B1 | 2/2003 | Cannell | |
| 6,567,574 B1 | 5/2003 | Ma et al. | |
| 6,574,398 B2 | 6/2003 | Coldren et al. | |
| 6,983,110 B2 * | 1/2006 | Buckman et al. | 398/212 |
| 7,035,549 B2 * | 4/2006 | Davies et al. | 398/164 |
| 7,263,476 B1 * | 8/2007 | Dellacona | 703/13 |
| 7,580,637 B2 * | 8/2009 | El-Ahmadi et al. | 398/135 |
| 2004/0207926 A1 * | 10/2004 | Buckman et al. | 359/642 |

* cited by examiner

*Primary Examiner* — Shi K Li

(57) ABSTRACT

A system can include a transmitter that produces an optical signal having a plurality of carrier frequencies and a receiver separated from the transmitter by free space through which the optical signal propagates. The receiver includes an array of detectors of multiple types, with the types being capable of detecting light respectively having the carrier frequencies. A location of an incident area where the optical signal is incident on the detector array generally depends on a misalignment of the receiver relative to the transmitter, but the detectors in the detector array are arranged so that at least one detector of each of the types detects light from the optical signal regardless of where the incident area is on the detector array.

25 Claims, 3 Drawing Sheets

FREE SPACE WDM SIGNAL DETECTOR

BACKGROUND

Systems employing wavelength-division multiplexed (WDM) optical signals can partition data into multiple data channels and encode each data channel on a monochromatic optical carrier beam having a different frequency. The monochromatic optical beams can then be combined into a single beam, thereby forming a WDM signal that may be transmitted through a single optical system, e.g., on the same optical fiber. Transmitting data using multiple optical carrier frequencies thus multiplies the data transmission bandwidth of an optical system when compared to systems using the same data encoding techniques on a monochromatic beam.

A receiver of a WDM signal typically uses the difference in the carrier frequencies to isolate or separate the individual frequency components. The individual signals can then be decoded to extract the received data. In general, such decoding employs photodiodes or similar light detectors that produce electrical signals corresponding to the separated frequency components, and the electric signals can be manipulated or processed using conventional electronic circuitry.

Free space optical communications avoid the complexity and cost of optical fibers or waveguides that carry optical signals from a transmitter to a receiver. However, the free space distance between a transmitter and a receiver typically makes alignment more difficult. Systems that tolerate these misalignments are thus desirable or necessary for free space optical communications. An alignment tolerant system for WDM optical communications would also be desirable to avoid the need for optical fibers or waveguides while providing a high data bandwidth.

SUMMARY

In accordance with an aspect of the invention, a detector for a wavelength division multiplexed optical signal includes an array of detectors of multiple types. The different types of detectors are capable of detecting light respectively having carrier frequencies of the wavelength multiplexed optical signal. The detectors are additionally arranged in the array so that any incident area of the wavelength multiplexed optical signal on the array provides a detectable amount of light to at least one detector of each type. Units of channel electronics, respectively corresponding to the types of detector, can be connected to all of the detectors of the corresponding type to provide output signals from detectors receiving sufficient illumination.

In accordance with another aspect of the invention, a system can include a transmitter that produces an optical signal having multiple carrier frequencies and a receiver separated from the transmitter by free space through which the optical signal propagates. The receiver includes an array of detectors of multiple types, with the types being capable of detecting light respectively having the carrier frequencies. A location of an incident area where the optical signal is incident on the detector array generally depends on a misalignment of the receiver relative to the transmitter, but the detectors in the detector array are arranged so that at least one detector of each of the types detects light from the optical signal regardless of where the incident area is on the detector array.

BRIEF DESCRIPTION OF THE DRAWINGS

FIG. 1 shows a server system employing free space wavelength division multiplexed optical communications in accordance with an embodiment of the invention.

FIGS. 2A, 2B, and 2C show plan views of detector arrays in accordance with embodiments of the invention for free space wavelength division multiplexed communications.

Use of the same reference symbols in different figures indicates similar or identical items.

DETAILED DESCRIPTION

In accordance with an aspect of the invention, a detector system for a free space wavelength division multiplexed (WDM) signal includes an array or mosaic of detectors of different types. To provide tolerance to static and dynamic misalignment, the array can be made large relative to a WDM signal beam profile, so that even when the center of the detector is misaligned with the WDM signal beam by more than the beam width, the beam will be incident on an active area of the array. The different types of detectors in the array are able to detect different frequency components of the WDM signal beam. The detectors can be made small relative to the WDM signal beam profile and are arranged in the array so that at least one detector of each type will receive light from the WDM signal beam regardless of where the WDM signal is incident on the array.

Figures 1, 2A:
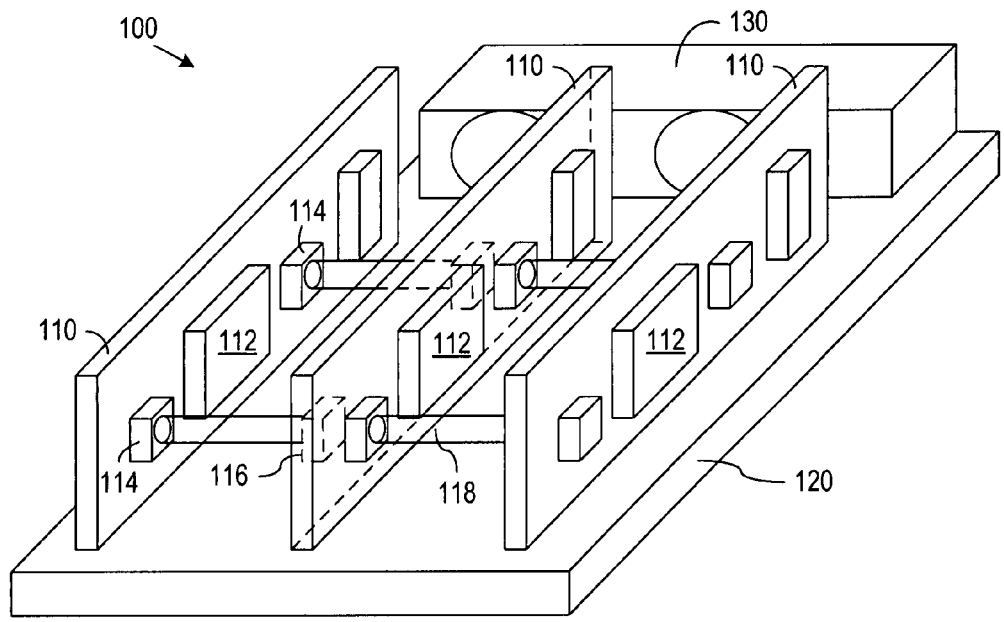

Detector systems in accordance with the invention can be used for communications in a variety of systems where high data rate and alignment tolerant optical communication are desired. FIG. 1 illustrates the example of a server system 100 using WDM communications in accordance with an embodiment of the invention. System 100 includes a set of blades 110 that are mounted on a shared backplane 120. Additional components 130 such as power supply transformers and cooling fans can also be connected to backplane 120, and the entire assembly would typically be contained in a shared enclosure (not shown). A user interface and sockets for external connections to server system 100 may be provided through the shared enclosure.

Some or all of blades 110 in server system 100 may be substantially identical or of differing designs to perform different functions. For example, some blades 110 may be server blades or storage blades. Each blade 110 includes one or more subsystems 112 that implement the particular functions of the blade 110. Subsystems 112 may be mounted on either one or both sides of each blade 110 in the manner of components on a printed circuit board, or blades 110 may include enclosures with subsystems 112 in the interior of the blade 110. Typical examples of such subsystems 112 include hard drives or other data storage and processor subsystems containing conventional computer components such as microprocessors, memory sockets, and integrated circuit memory. Subsystems 112 and the general features of blades 120 may be of conventional types known for server systems using blade architectures, such as the c-class architecture of sever systems commercially available from Hewlett-Packard Company.

Each blade 110 additionally includes one or more optical transceivers 114 or 116. Each transceiver 114 is positioned on a blade 110 to be nominally aligned with a corresponding transceiver 116 on a neighboring blade 110 when the blades 110 are properly mounted on backplane 120. Transceivers 114 and 116 may otherwise be substantially identical to each other. In a typical configuration for server system 100, there may be about 5 cm of free space or air gap between corresponding transceivers 114 and 116, and each aligned pair of transceivers 114 and 116 may be subject to misalignment on the order of about 500 to 1000 µm due to variations in the mechanical mounting of blades 110. Additionally, the alignment of transceivers 114 and 116 may be subject to variations on the order of 40 to 50 µm due to temperature variations and/or mechanical vibrations, for example, from the operation of cooling fans.

The transmitter section in transceiver 114 or 116 produces a WDM signal 118 and may be of any suitable design including those well known in the art. Such systems generally employ laser diodes and suitable optics to collimate WDM signal 118 and direct WDM signal at a target receiver. The receiver section of each transceiver 114 or 116 generally includes an array of detectors of different types. The detector array as described further below provides alignment tolerance that permits blades 110 to communicate with each other even when transceivers 114 and 116 are subject to misalignment, pointing errors, and vibrations.

Detector arrays in accordance with embodiments of the invention can be constructed for WDM optical signals using any number N of carrier frequencies. For the purpose of illustration, FIG. 2A shows a plan view of a detector array 200 suitable for one specific embodiment of the invention in which a WDM optical signal uses nine carrier frequencies f1 to f9. Detector array 200 is an arrangement of different types of detectors 1 to 9 where the detector types are in one-to-one correspondence with the number of carrier frequencies. Detectors of the same type can be connected together as described further below, so that detector array 200 has a set of electric output signals that are also in one-to-one correspondence with the carrier frequencies in the WDM optical signal. More specifically, for the illustrated example, detector array 200 includes nine types of detectors 1 to 9 respectively corresponding to the nine distinct frequency f1 to f9 in the WDM signal, and detector 200 produces nine output signals, one for each type of detector.

Each type of detector in array 200 is designed to distinguish the corresponding frequency from the other frequencies in the WDM optical signal. For example, each detector 1 in detector array 200 may include a photodiode and a filter that passes a corresponding frequency f1 to the photodiode while blocking all other frequencies f2 to f9. More generally, the frequency selection capabilities of each detector 1 to 9 may be provided through use of a filter, through design of the photodiode to efficiently detect photons of the corresponding frequency while failing to absorb or detect photons having the other carrier frequencies, or any other known technique for selectively measuring the amplitude of a desired frequency component. Such detectors are known in the field of color imaging, and some conventional detector designs are described, for example, in U.S. Pat. Nos. 3,971,065 and 5,965,875.

Photodiodes when used in detectors 1 to 9 may each have a light sensitive area of a size selected according to the data rate of the corresponding frequency channel. For a data rate of 10 Gb/s or larger the width of the light sensitive area generally needs to be less than about 40 µm across.

A WDM optical communication channel using detector array 200 can be made tolerant of misalignment by: (1) making detector array 200 large enough that a beam having any misalignment within an expected range will still be incident on detector array 100 and (2) arranging detectors 1 to 9 in a pattern such that for any incident area of the WDM beam on detector array 200, measurable amounts of light will enter at least one of each type of detector 1 to 9.

FIG. 2A shows an incident area 210 corresponding to the position of the WDM signal on detector array 200 when the WDM signal beam has an ideal alignment at the center of detector array 200. As shown in FIG. 2A, area 210 covers or significantly overlaps at least one of each type of detector 1 to 9, and area 210 generally corresponds to an area of sufficient light intensity for reliable operation of detectors 1 to 9. More specifically, for at least one detector 1 to 9 of each type, the WDM signal having incident area 210 provides sufficient optical power to overcome sources of technical noise in the electronics connected to the detectors.

In practice, detector array 200 may be subject to static and dynamic misalignment with the source of the WDM signal beam, so that the actual incident area of the WDM signal beam is offset from the center of detector array 200. FIG. 2A illustrates an example of an incident area 220 which is offset from the ideally aligned position by more than the beam width so that none of the detectors used for signal detection when alignment is ideal are sufficiently illuminated for signal detection when area 220 is the incident area of the WDM signal. As shown in FIG. 2A, although area 220 is away from the ideally aligned location at least one of each type of detectors 1 to 9 still receives light from WDM optical signal 220. More generally, the expected misalignment of the WDM optical signal with detector array 200 may place the incident area of the signal at any location on the detector, including positions that may overlap area 210. The size and arrangement of detectors 1 to 9 in detector array 200 are such that for all positions of the incident area at least one detector of each type is sufficiently illuminated for signal detection.

The nine types of detectors 1 to 9 in the specific example of FIG. 2A are arranged in a rectangular array with the detector types 1 to 9 being sequentially arranged in each row and the sequence in each row being offset by three detectors relative from the sequences of neighboring rows. With this arrangement, any 3×3 square group of adjacent detectors in detector array 200 contains one of each type of detector. The area of the beam profile 210 or 220 is greater than the area of nine detectors 1 to 9, so that the beam profile 210 or 220 overlaps at least one of each type of detector 1 to 9. Other patterns or arrangements of detectors 1 to 9 as described further below can achieve the same result.

The arrangement of detectors in arrays for WDM signals having N carrier frequencies will in general depend on the number N of carrier frequencies and the size and shape of the WDM beam cross-section. For example, when the number N is a squared integer (i.e., $N=n^2$ for some integer n), N detectors, one of each type, can be arranged in a square group, such as the 3×3 detector groups 205 shown in FIG. 2A. These identical square groups can then be used to tile the area of the detector array as in the example of FIG. 2A, so that the beam profile larger than the n×n group on the detector should be sufficient to cover or sufficiently overlap at least one complete set of detector types.

Figures 2B, 2C:
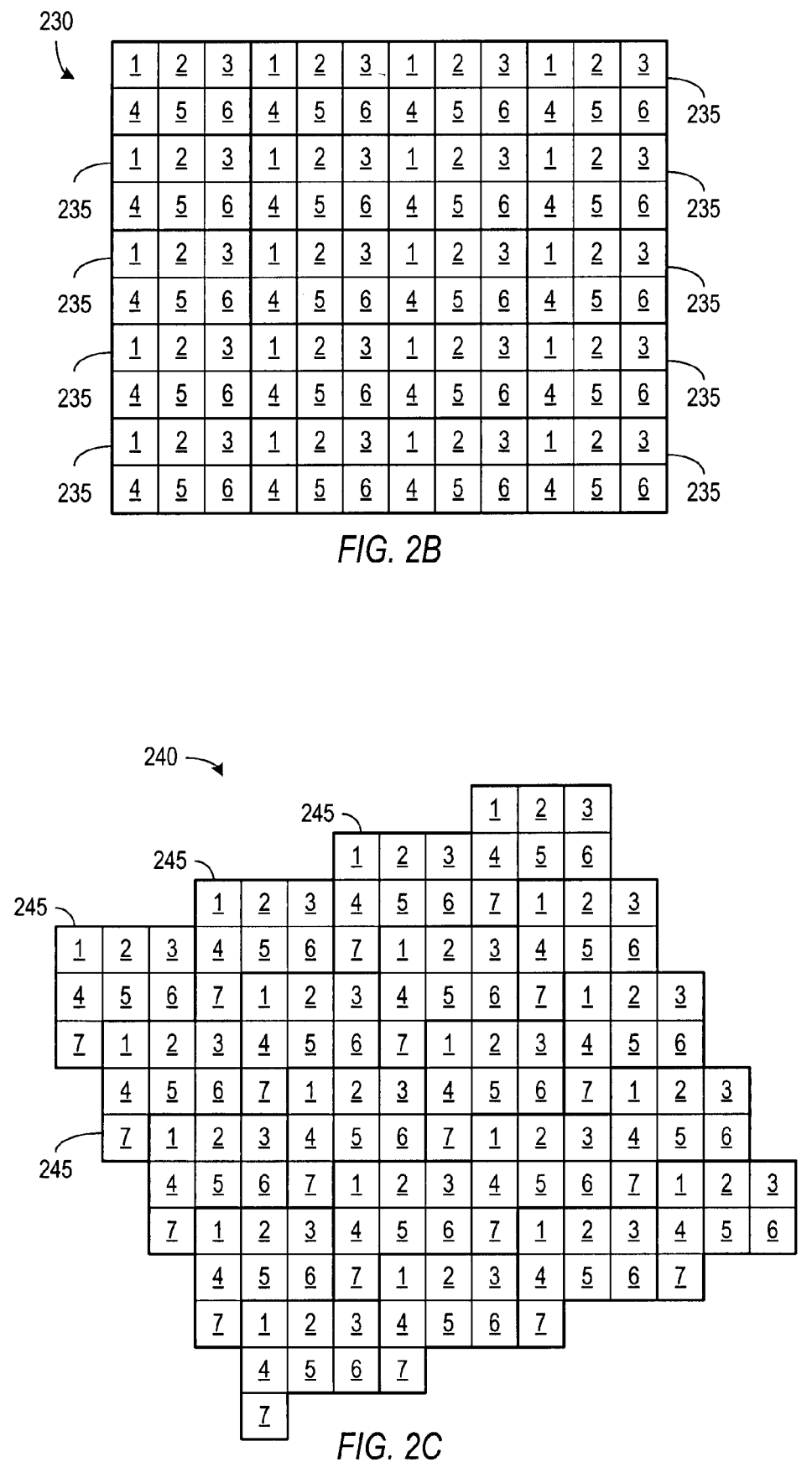

When the number N of carrier frequencies is not equal to a squared integer, N detectors of the different types can be arranged in a rectangular or L-shaped group that fits within an n×n arrangement where $n^2$ is the smallest squared integer larger than N. For example, detectors can be arranged in an n×(n−1) or (n−1)×n rectangular group when the number N is equal to n(n−1). In this specific case, identical rectangular detector groups can be used to tile the detector area. FIG. 2B, for example, illustrates a detector array 230 containing six types of detectors 1 to 6 that are arranged in rectangular groups 235. Groups 235 are used to tile the area of detector array 230 and are in rows and columns in the embodiment of FIG. 2B. Alternatively, rows or columns of detector array 230 may be offset relative to each other. With this arrangement, a WDM signal beam having profile with an area larger than an n×n group on detector array 230 will provide measurable light to at least one of each type of detector 1 to 6.

When the number N can be expressed as $n^2-k$ for some positive integers n and k with k<n or n<k<2n−1, N different detector types can be arranged in an L-shaped group that fits within an n×n square arrangement. FIG. 2C, for example, illustrates a detector array 240 containing seven types of detectors, i.e., N=7, n=3, and k=2. L-shaped groups 245 in detector array 240 each contain one of each type of detector 1 to 7 and fit within a 3×3 detector square. Further, as illustrated in FIG. 2C, L-shape groups 245 can be arranged like tiles to cover the area of detector array 240. With this configuration, a beam profile the covers an area greater than 3×3 detector group will project light into at least one of each type of detector 1 to 7 regardless of the incident location of the beam on detector array 240.

More generally, many alternative tiling arrangements for N types of detectors are possible such that the beam incident area covers or significantly overlaps at one of each type of detector. Such tilings of detectors are not limited to square detectors or rectangular arrays.

An exemplary configuration of a detector array for a transceiver in a server system is about 1 to 2 mm across to accommodate misalignments on the order of about 1 mm. The WDM signal beam in this embodiment could have a flat-field beam waist diameter (which is the $1/e^2$ power diameter) of about 0.4 to 0.5 mm. The per-detector area is preferably less than the area of the incident beam profile divided by the smallest squared integer greater than the number of carrier frequencies. For the embodiments of FIGS. 2A, 2B, and 2C, the beam profile has a diameter of about 4× the individual detector element size, and each detector has an area that is less than about one ninth the incident WDM beam area. Detector arrays of this size can be fabricated in and on a single integrated circuit chip using techniques similar to those known for fabrication of CMOS image sensors.

Figure 3A:
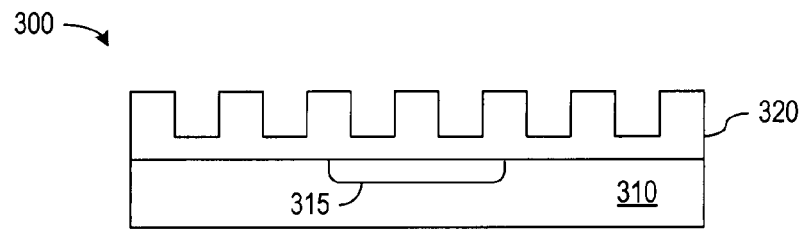
FIGS. 3A and 3B show detectors suitable for use in the detector arrays of FIG. 2A, 2B, or 2C.
Figure 3B:
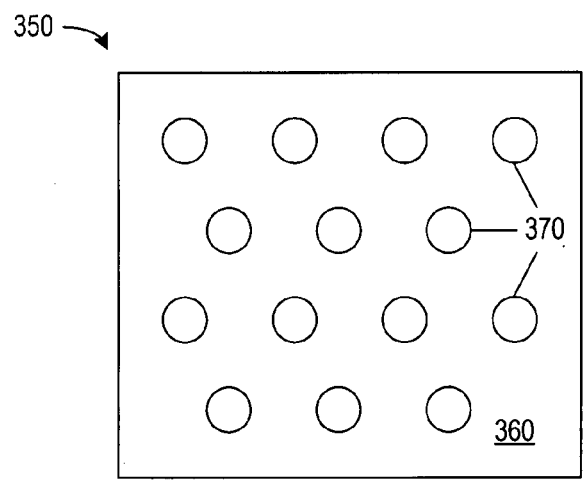

FIG. 3A shows a single detector 300 suitable for use in detector arrays such as described above. Detector 300 includes a semiconductor layer 310 including an active region 315 forming a photodiode with underlying layers. A filter 320, which can be a waveguide grating, grid filter, Fabry-Perot or other filter structure, overlies active region 315 and can selectively pass light of the wavelength/frequency that detector 300 senses. As an alternative to employing an overlying filter, an active area 360 of a photodiode 350 as shown in FIG. 3B can be patterned, for example, by drilling holes 370, to create interference effects that accept or reject specific wavelengths/frequencies of light. Detectors 300 or 350 can be integrated monolithically with similar detectors having filters or active layers designed for detection of different light wavelengths.

Figure 4:
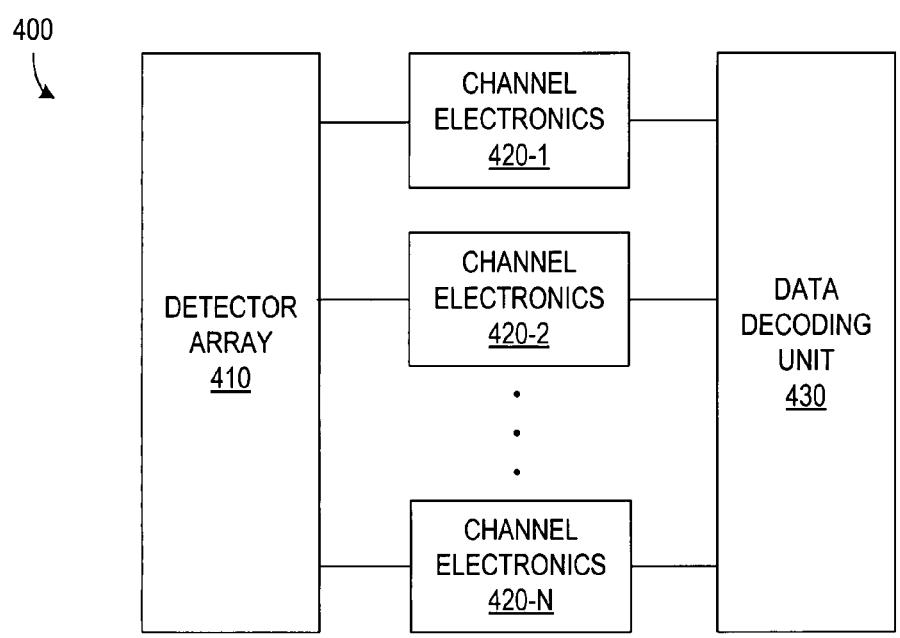
FIG. 4 is a block diagram of a detector system in accordance with an embodiment of the invention.

FIG. 4 is a block diagram of a decoding system 400 in accordance with an embodiment of the invention. Decoding system 400 includes a detector array 410 including N types of detectors arranged as described above, channel electronics 420-1 to 420-N for N channels respectively associated with the N types of detectors, and a data decoding unit 430 that decodes electrical signals form channel electronics 420-1 to 420-N to extract received data. Detector array 410, channel electronics 420-1 to 420-N, and data decoding unit 430 can all be fabricated in a single integrated circuit or may be on separate devices.

Detector array 410 includes detectors suitable for converting optical signals having specific frequencies or in specific frequency bands into electrical signals. As disclosed above, each such detector may include a photodiode and a filter mechanism that selects the frequency of light that causes the detector to generate an electrical signal. In general, only the detectors that are sufficiently illuminated by a WDM signal will produce a useful signal, and the voltage or current amplitude from the illuminated detectors will in general depend on the intensity of incident light and the portion of the detector area illuminated. Other detectors will either produce noise or no signal.

Each unit of channel electronics 420-1 to 420-N corresponds to a specific type of detector in detector array 410 and combines the signals from all detectors of the corresponding type. In a simple embodiment, each unit of channel electronics 420-1 to 420-N is a node to which output terminals of all of the detectors of the corresponding type are connected. For example, the output terminals of all detectors of type 1 may be connected to a single node in channel electronics 420-1, and the active or illuminated detectors of type 1 drive the output signal of channel electronics 420-1. Similarly, the output terminals of all detectors of type N may be connected to a single node in channel electronics 420-N, so that the active or illuminated detectors of type N drive the output signal of channel electronics 420-N. Alternatively, each unit of channel electronics 420-1 to 420-N can include active circuitry that identifies detectors of the corresponding type that are producing useful signals. The active circuitry, for example, can shut off connections to detectors of the corresponding type if their respective output signals are at levels indicative of a low signal-to-noise ratio or if the detectors are away from a determined beam location.

Data decoding unit 430 receives and decodes N electrical signals respectively from channel electronics 420-1 to 420-N. In a typical application, the amplitudes of carrier frequencies of the WDM optical signal are modulated to represent data in N channels. Data decoding unit 430 decodes the modulation to extract and construct received data.

Although the invention has been described with reference to particular embodiments, the description is only an example of the invention's application and should not be taken as a limitation. For example, references are made above to light and optical systems, but such references are not limited to visible light or systems for visible light. Principles described above can be more generally applied to a wide spectrum of electromagnetic radiation. Various other adaptations and combinations of features of the embodiments disclosed are within the scope of the invention as defined by the following claims.

What is claimed is:

1. A detector system for a wavelength division multiplexed optical signal, the detector comprising:
    an array of detectors of a plurality of types, each of the detectors being capable of detecting light having a frequency corresponding to the type of the detector and excluding detection of light having a frequency corresponding to another of the types of the detectors, wherein the detectors tile an entire area of the array and are arranged so that any incident area of the wavelength multiplexed optical signal on the array provides a detectable amount of light to only a subset of the detectors in the array, the subset including at least one detector of each type; and
    a plurality of units of channel electronics, wherein each of the units of channel electronics corresponds to one of the types of the detectors and is connected to all of the detectors of the corresponding type.

2. The detector system of claim 1, wherein the types of detectors consist of $n^2$ types for an integer n, and the array of detectors is tiled with square groups of $n^2$ adjacent detectors with each square group containing one detector of each of the types.

3. The detector system of claim 1, wherein the types of detectors consist of n(n−1) types for an integer n, and the array of detectors is tiled with rectangular groups of n(n−1) adjacent detectors with each rectangular group containing one detector of each of the types.

4. The detector system of claim 1 wherein the types of detectors consist of N types, and the array of detectors is tiled with L-shaped groups of N adjacent detectors, where each L-shaped group consists of one detector of each of the types.

5. The detector system of claim 1, wherein each of the detectors comprises a photodiode and a filter, wherein a wavelength of light passed through the filter depends on the type of the detector.

6. The detector system of claim 1, wherein each of the detectors comprises a photodiode having an active area that is patterned to create interference effects that control which frequencies of light that the detector detects.

7. The detector system of claim 1, wherein each of the units of the channel electronics comprises a node to which output terminals of all of the detectors of the corresponding type are connected.

8. The detector system of claim 1, wherein each of the units of the channel electronics comprises active circuitry connected to select from among the detectors of the corresponding type, a set of the detectors from which an output signal is generated.

9. The system of claim 1, wherein the array of detectors is tiled with groups of adjacent detectors, wherein each group covers an area smaller than the incident area of the wavelength multiplexed optical signal on the array and contains at least one detector of each of the types.

10. A system comprising:
   a transmitter that produces an optical signal having a plurality of carrier frequencies; and
   a receiver separated from the transmitter by free space through which the optical signal propagates, wherein:
      the receiver comprises an array of detectors of multiple types, each of the types including a plurality of detectors in the array, each of the detectors being capable of detecting light having one of the carrier frequencies that corresponds to the type of that detector and excluding detection of another of the carrier frequencies in the optical signal;
      an incident area where the optical signal is incident on the array is smaller than the array of detectors and has a location that depends on a misalignment of the receiver relative to the transmitter; and
      the detectors tile an entire area of the array and are arranged so that at least one detector of each of the types detects light from the optical signal regardless of the location of the incident area on the array.

11. The system of claim 10, wherein the misalignment has a magnitude greater than a width of the incident area.

12. The system of claim 11, wherein the detector array has a width greater than a maximum magnitude expected for the misalignment.

13. The system of claim 10, wherein the optical signal is a wavelength division multiplexed signal representing data.

14. The system of claim 10, wherein the system comprises a server system including a first blade on which the transmitter resides and a second blade on which the receiver resides.

15. The system of claim 14, wherein the optical signal is a wavelength division multiplexed signal that conveys data from the first blade to the second blade.

16. The system of claim 10, wherein the array of detectors is tiled with groups of adjacent detectors, wherein each group covers an area smaller than an area of the detector array illuminated by the optical signal and contains at least one detector of each of the types.

17. The system of claim 10, wherein the types of detectors consist of n(n−1) types for an integer n, and the array of detectors is tiled with rectangular groups of n(n−1) adjacent detectors with each rectangular group containing one detector of each of the types.

18. The system of claim 10, wherein the types of detectors consist of N types, and the array of detectors is tiled with L-shaped groups of N adjacent detectors, where each L-shaped group consists of one detector of each of the types.

19. The system of claim 10, wherein each of the detectors comprises a photodiode having an active area that is patterned to create interference effects that control which frequencies of light that the detector detects.

20. A process comprising:
   transmitting an optical signal having a plurality of carrier frequencies through free space from a transmitter to a receiver containing a detector array, wherein the detector array includes detectors of a plurality of types, each of the types including a plurality of detectors in the array, each of the detectors being capable of detecting light having a carrier frequency corresponding to the type of that detector and excluding detection of light having another of the carrier frequencies;
   receiving the optical signal at an incident area on the detector array, wherein the incident area is smaller than the array and has a location that depends on a misalignment of the receiver relative to the transmitter; and
   detecting each of the carrier frequencies with at least one of the detectors capable of detecting the carrier frequency, where the detectors tile the array and are arranged so that at least one detector of each of the types receives light from the optical signal regardless of the location of the incident area on the array.

21. The process of claim 20, wherein transmitting the optical signal comprises transmitting the optical signal from a first blade in a server system to a second blade in the server system, wherein the optical signal conveys data from the first blade to the second blade.

22. The process of claim 20, wherein each of the detectors comprises a photodiode having an active area that is patterned to create interference effects that control which frequencies of light that the detector detects.

23. The process of claim 20, wherein the detector array is tiled with groups of adjacent detectors, wherein each group covers an area smaller than an area of the detector array illuminated by the optical signal and contains at least one detector of each of the types.

24. The process of claim 20, wherein the types of detectors consist of n(n−1) types for an integer n, and the array of detectors is tiled with rectangular groups of n(n−1) adjacent detectors with each rectangular group containing one detector of each of the types.

25. The process of claim 20, wherein the types of detectors consist of N types, and the array of detectors is tiled with L-shaped groups of N adjacent detectors, where each L-shaped group consists of one detector of each of the types.

* * * * *